(No Model.)
S. P. MOULTHROP.
EDUCATIONAL APPARATUS.
No. 577,196. Patented Feb. 16, 1897.
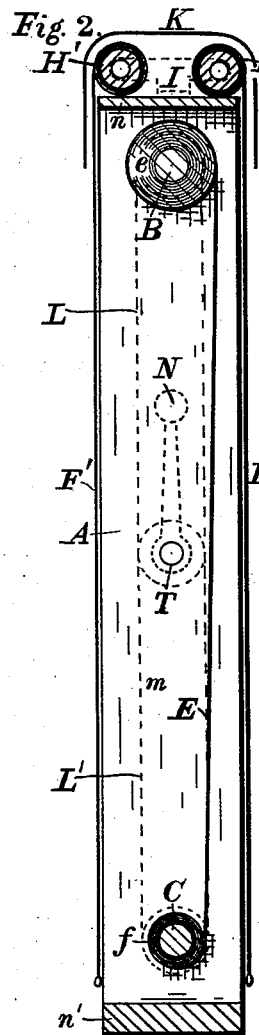
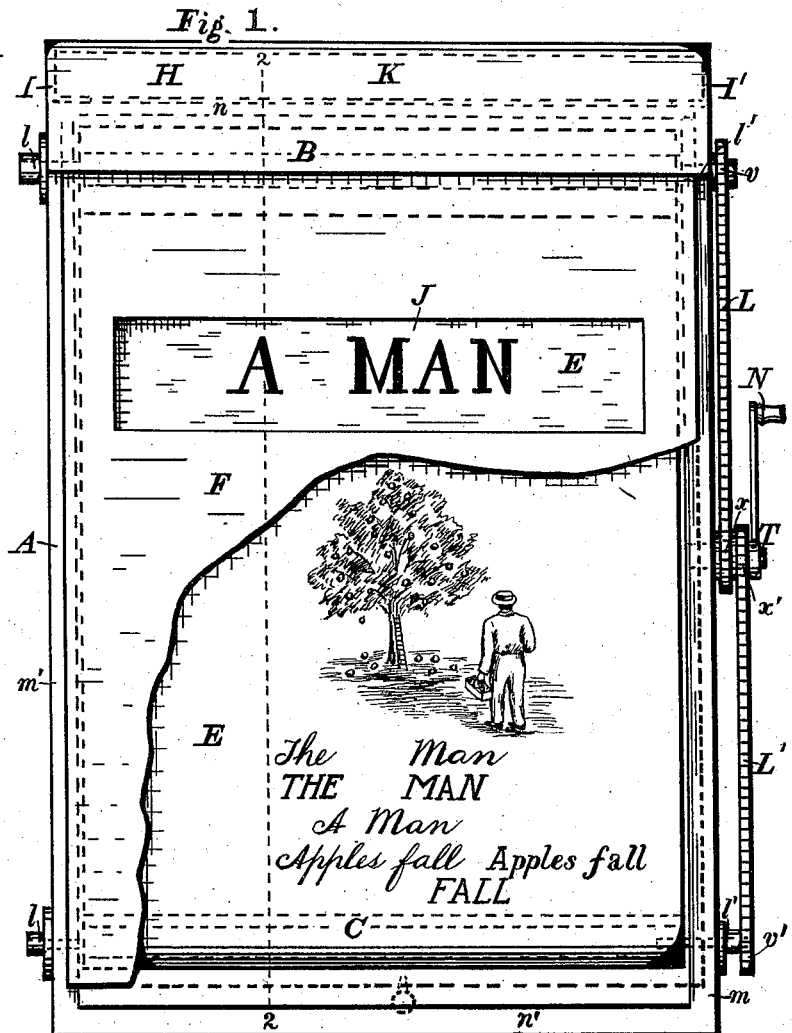
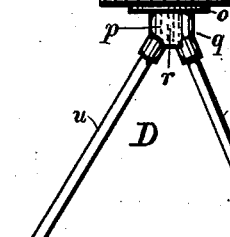
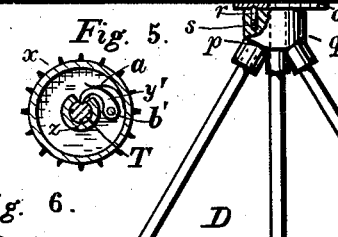
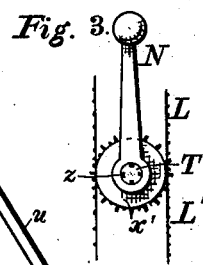
Witnesses:
C. G. Crannell
D. E. Eaton
Inventor:
Samuel P. Moulthrop,
By Geo. B. Selden, atty.

UNITED STATES PATENT OFFICE.

SAMUEL P. MOULTHROP, OF ROCHESTER, NEW YORK.

EDUCATIONAL APPARATUS.

SPECIFICATION forming part of Letters Patent No. 577,196, dated February 16, 1897.

Application filed September 8, 1896. Serial No. 605,108. (No model.)

*To all whom it may concern:*

Be it known that I, SAMUEL P. MOULTHROP, a citizen of the United States, residing at Rochester, in the county of Monroe, in the State of New York, have invented an Improvement in Educational Apparatus, of which the following is a specification, reference being had to the accompanying drawings.

My invention relates to an improvement in educational apparatus, which improvement is fully described and illustrated in the following specification and the accompanying drawings, the novel features thereof being specified in the claims annexed to the said specification.

In the accompanying drawings, representing an educational apparatus embodying my invention, Figure 1 is a front elevation. Fig. 2 is a vertical section on the line 2 2, Fig. 1. Fig. 3 represents the handle and sprockets. Figs. 4 and 5 are transverse sections of the sprockets. Fig. 6 is an inverted view of the plate at the bottom of the frame.

A represents a frame or framework of any suitable dimensions, supported so it can be rotated about its vertical axis on a tripod D or other suitable structure.

Inside the frame are placed the upper and lower rollers B and C, to which the ends of the flexible educational chart E, which may be wound upon either of the rollers, are attached, the chart unwinding from one roll as it winds up on the other. In Fig. 2 the larger portion of the chart is represented at $e$ as wound on the upper roller, while the smaller portion is shown at $f$ on the roller C. The chart extends between the upper and lower rollers, and its surface, which is covered with any suitable educational matter adapted to teaching reading, writing, arithmetic, or other branches, is plainly displayed to teacher and pupils when the curtain F is wound up. This curtain is attached to a spring shade-roller H of any suitable or ordinary construction, which is supported on brackets I I' at each end of the frame in such position that the curtain F falls downward in front of the chart when unwound and may be used to conceal its whole surface between the upper and lower rollers or any desired portion thereof.

In Fig. 1 a portion of the curtain F is represented as broken away to expose the printing, engraving, or lithographing on the chart behind the omitted portion of the curtain. An aperture or opening J, Fig. 1, of any suitable shape or dimensions and arranged in any suitable relation, is made through the curtain, by which the pupil's attention may be directed to any particular part of the educational matter impressed on the curtain, all the rest being concealed.

It will be observed that the curtain can be drawn down below the lower roller, so that the opening J may be brought opposite the lower part of the chart, so as to display any printed matter there, while the rest of the chart is covered.

The ends of the chart are attached to the rollers B and C in any suitable or preferred way.

The rollers may be of wood, with suitable spindles $l$ $l'$ projecting through the sides $m$ $m'$ of the frame or revolving in suitable journals attached thereto.

$n$ and $n'$ are the upper and lower cross-bars of the frame, to which the sides $m$ $m'$ are attached at the corners in any suitable way, angle-irons or brackets being employed, if desired. The frame is made of a depth at least equal to the diameter of the roll of paper when the whole chart is wound up on one of the rollers. The lower cross-bar $n'$ has attached to its lower side a plate $o$, having a pin or spindle $p$ projecting downward therefrom and turning freely in a hole in the socket $q$, which is supported by the legs $u$ of the tripod D.

In one of the forms of my improved educational apparatus the chart is printed with suitable matter on both sides, and the pin $p$, by turning freely in the socket $q$, permits the frame to be turned about its vertical axis, so that either side of the chart can be displayed to the pupils at the will of the instructor.

In order to secure the frame and chart in position with either surface of the chart in front of the class, I employ the pin $r$, which engages with either of the holes or depressions $t$ $t'$, Fig. 6, in the lower surface of the plate $o$. These holes $t$ $t'$ are placed diametrically opposite each other. The pin $r$ slides freely in a hole in the socket $q$, being pressed upward by the spiral spring $s$. Any other suitable device may be employed for this purpose.

The curtain F', wound on the spring-roller H', serves to conceal the side of the chart opposite that covered by curtain F. The roller H' is carried by the bracket I, and the curtain F' may be provided with openings corresponding with opening J, (one or more,) of any suitable shape or size, as may be desired. A suitable hood K, which may be of sheet metal, covers and incloses the spring-rollers, being made tight at the ends. This hood is attached to the frame in any suitable manner.

It will be observed that the curtain F is wider than the distance between the inner surface of the sides $m$ $m'$, so that the edges of the curtain lap over the frame and serve to protect the chart and to prevent its becoming discolored or soiled by dust or moisture. A similar arrangement may be adopted with reference to the curtain F', or in the case where the chart is printed on one side only a suitable back may be applied to the frame.

In order to wind the chart on the rollers B or C, I employ the handle N and chains L L', running over suitable sprockets. The handle N is connected with the sprockets $x$ $x'$ in such a manner that when turned in one direction it operates one of the sprockets $x$ and when turned in the other direction it operates the sprocket $x'$. The handle N is attached to a shaft T, which revolves in a suitable socket attached to the side $m$ of the frame. The shaft T is provided with a number of notches or longitudinal grooves $z$, Figs. 3, 4, and 5, with which the pawls $y$ $y'$ on the sprockets engage. These pawls point in opposite directions, and consequently when the handle and shaft are turned in one direction one of the sprockets is caused to turn with them, while the other is not affected or may revolve in the opposite direction. Through the chains L L' one of the rollers B or C is thus revolved, so as to wind up the chart on it, while it is unwound from the other roller, but at the same time the resistance of the pawls and the friction on the shaft serve to maintain a tension on the chart which keeps it taut and smooth and prevents wrinkling. The pawls $y$ $y'$ are pivoted to the web of the sprockets $x$ $x'$ at $b$ $b'$, Figs. 4 and 5, and they are provided with springs $a$ $a'$, which force their free ends into contact with the shaft T or the grooves $z$ thereon. The hubs of the sprockets are cut away, so as to permit the pawls to bear on the shafts.

My improved educational apparatus is simple, cheap, and durable, is easily manipulated, and is applicable to teaching any branch of study in a manner producing more satisfactory results than any device for any similar purpose with which I am acquainted.

I claim—

1. The combination, in an educational apparatus, of the upper and lower rollers having the chart printed on both sides attached thereto at its ends and extending as a single web between them, the open frame inclosing the rollers and chart and of a depth greater than the diameter of the chart when fully wound on one of the rollers, the support on which the frame is pivotally sustained so that it may be turned about its vertical axis, means for revolving either of the rollers independently of the other, and the curtains on opposite sides of the frame, wider than the open space of the frame, and adapted to be wound up and down in front of either side of the chart, whereby a part only of either side of the chart may be displayed, and the whole chart may be protected from both sides when the curtains are unwound, substantially as described.

2. The combination, in an educational apparatus, of the upper and lower rollers having the chart printed on both sides attached thereto at its ends and extending as a single web between them, the open frame inclosing the rollers and chart and of a depth greater than the diameter of the chart when fully wound on one of the rollers, means for revolving either of the rollers independently of the other, the curtains on opposite sides of the frame and of a width greater than its interior and adapted to be wound up and down independently in front of either side of the chart, and the protecting-hood above the curtain-rollers, substantially as described.

3. The combination, in an educational apparatus, of a suitable supporting-frame, the upper and lower rollers provided with sprockets, and having the educational chart attached thereto at its ends, an intermediate shaft having a handle and sprockets, the sprocket-connecting chains, and means for rotating one of the sprockets while the other is permitted to turn freely, substantially as described.

4. The combination, in an educational apparatus, of a suitable frame, supported so as to rotate about its vertical axis, the upper and lower rollers journaled in the frame, the chart printed on both sides and capable of being rolled on either of the rollers, the curtain in front of the chart, the recessed plate $o$ and pin and spring $r$ $s$, substantially as described.

5. The combination with the frame A, of the rollers B and C, having sprockets $v$ $v'$ the educational chart E, the chains L L', handle N, sprockets $x$ $x'$, and means for rotating one of the sprockets from the handle while the other is disconnected, substantially as described.

6. The combination with the frame A, of the rollers B and C, having sprockets $v$ $v'$, the chains L L', handle N, sprockets $x$ $x'$, the shaft T, pawls $y$ $y'$ and springs $a$ $a'$, substantially as described.

SAMUEL P. MOULTHROP.

Witnesses:
GEO. B. SELDEN,
D. E. EATON.